United States Patent
Hendrickson

(10) Patent No.: US 7,970,172 B1
(45) Date of Patent: Jun. 28, 2011

(54) ELECTRICALLY CONTROLLED OPTICAL SHIELD FOR EYE PROTECTION AGAINST BRIGHT LIGHT

(76) Inventor: James Anthony Hendrickson, Redmond, WA (US)

(*) Notice: Subject to any disclaimer, the term of this patent is extended or adjusted under 35 U.S.C. 154(b) by 1095 days.

(21) Appl. No.: 11/691,351

(22) Filed: Mar. 26, 2007

Related U.S. Application Data

(63) Continuation-in-part of application No. 11/626,787, filed on Jan. 24, 2007, now abandoned.

(60) Provisional application No. 60/761,378, filed on Jan. 24, 2006.

(51) Int. Cl.
*G06K 9/00* (2006.01)
*G05D 1/00* (2006.01)
*B60R 21/16* (2006.01)

(52) U.S. Cl. ............ 382/103; 382/100; 701/28; 280/735

(58) Field of Classification Search .................. 382/100, 382/103; 701/28; 280/735
See application file for complete search history.

(56) References Cited

U.S. PATENT DOCUMENTS

| | | |
|---|---|---|
| 2,005,426 A | 6/1935 | Land |
| 2,251,330 A | 8/1941 | Fairbank |
| 3,171,134 A | 3/1965 | Kennedy |
| 3,436,761 A | 4/1969 | Liautaud et al. |
| 3,505,679 A | 4/1970 | Bennett |
| 3,577,566 A | 5/1971 | Kislin |
| 3,689,136 A | 9/1972 | Atamian |
| 3,944,346 A | 3/1976 | Shindler |
| 4,099,839 A * | 7/1978 | Giglia .......................... 359/271 |
| 4,102,566 A | 7/1978 | Shelton |
| 4,119,369 A | 10/1978 | Eloranta et al. |
| 4,196,982 A | 4/1980 | Watkins |
| 4,386,832 A | 6/1983 | Nannini |
| 4,730,915 A | 3/1988 | Jannard |
| 4,874,938 A | 10/1989 | Chuang |
| 5,298,732 A | 3/1994 | Chen |
| 5,305,012 A | 4/1994 | Faris |
| 5,438,378 A | 8/1995 | Blatter |
| 5,550,599 A | 8/1996 | Jannard |
| 5,714,751 A | 2/1998 | Chen |

(Continued)

OTHER PUBLICATIONS

Liamadis, G., "Role of Glass in Automotive Design Synthesis: Functional and Aesthetic Aspects," glassfiles.com, http://www.glassfiles.com/library/article_print.php?id=385, download date of Jan. 23, 2007.

(Continued)

*Primary Examiner* — Bhavesh M Mehta
*Assistant Examiner* — Utpal Shah
(74) *Attorney, Agent, or Firm* — Seed IP Law Group PLLC

(57) ABSTRACT

An active device provides protection from the sun or other bright light source for improved vision, using a variable opacity medium that is electronically controlled to cast a shadow on an eye of a user and/or to otherwise reduce the amount of the light incident on the eye, thereby reducing glare. Miniature cameras monitor the user's eye movements and the scene in front of the user. If a bright light is detected, one or more dark spots is created in the variable opacity medium that acts as a shade or light filter for a pupil of the eye. The variable opacity medium, cameras, and associated electronics can be used in connection with eyeglasses (including sunglasses), as part of a device worn by the user (such as a helmet), a windshield, mirror, or other optical element having a view port through which light can be seen by the user.

49 Claims, 5 Drawing Sheets

U.S. PATENT DOCUMENTS

| | | |
|---|---|---|
| 6,394,614 B1 | 5/2002 | Chang |
| 6,483,090 B1 | 11/2002 | Bae |
| 6,528,782 B1 | 3/2003 | Zhang |
| 6,786,610 B2 | 9/2004 | Faris |
| 6,820,897 B2 * | 11/2004 | Breed et al. ............... 280/735 |
| 7,193,767 B1 * | 3/2007 | Peeri ........................ 359/290 |
| 7,243,945 B2 * | 7/2007 | Breed et al. ............... 280/735 |
| 7,415,126 B2 * | 8/2008 | Breed et al. ............... 382/100 |
| 7,477,309 B2 * | 1/2009 | Cuccias ..................... 348/342 |
| 7,585,068 B2 | 9/2009 | Mullin et al. |
| 2002/0196518 A1 | 12/2002 | Xu et al. |
| 2004/0143091 A1 | 7/2004 | Xu et al. |
| 2005/0131607 A1 * | 6/2005 | Breed ........................ 701/45 |
| 2005/0157369 A1 | 7/2005 | Xu et al. |
| 2005/0200935 A1 | 9/2005 | Liu et al. |
| 2006/0140502 A1 | 6/2006 | Tseng et al. |
| 2006/0196613 A1 * | 9/2006 | Lamontagne et al. ....... 160/90 |

OTHER PUBLICATIONS

Robinson, M., "How I See Designing with Glass: The Role that Glass Plays in a Car can be Almost Limitless," AutoGlass, Sep./Oct. 2001, pp. 64-66.

"Float Glass," Pilkington Technology, http://www.pilkington.com/automotive+international/technology+and+processes/default.htm, download date of Jan. 23, 2007.

* cited by examiner

ELECTRICALLY CONTROLLED OPTICAL SHIELD FOR EYE PROTECTION AGAINST BRIGHT LIGHT

CROSS-REFERENCE TO RELATED APPLICATIONS

This application is a continuation-in-part application that claims the benefit under 35 U.S.C. §120 of U.S. patent application Ser. No. 11/626,787, entitled "ELECTRICALLY CONTROLLED OPTICAL SHIELD FOR EYE PROTECTION AGAINST BRIGHT LIGHT," filed Jan. 24, 2007, with inventor James Anthony Hendrickson, which in turn claims the benefit under 35 U.S.C. §119(e) of U.S. Provisional Patent Application Ser. No. 60/761,378, entitled "MOSTLY CLEAR AUTOMATIC GLASSES, HELMET, WINDSHIELD, AND WINDOW COVER THAT PROTECTS EYES FROM BRIGHT LIGHTS WITH A SPOT," filed Jan. 24, 2006, with inventor James Anthony Hendrickson, wherein these priority applications are incorporated herein by reference in their entireties.

TECHNICAL FIELD

The present disclosure generally relates to optical devices. Particularly but not exclusively, the present disclosure relates to optical devices having electrically controlled opacity.

BACKGROUND INFORMATION

Various devices and techniques exist to reduce glare from sunlight or other source of bright light. Reducing the glare serves to protect the eyes of a user or otherwise improves the vision of the user when looking through an optical element. For example, users can wear sunglasses, shaded goggles, or other type of shaded eyewear. As another example, some motor vehicles are equipped with rear-view mirrors and/or side-view mirrors that have "dimming" capability to reduce the glare from headlights of other vehicles. In yet other examples, windows in a home might be fitted with shades or curtains to block out sunlight.

However, such devices and techniques are deficient in several ways. For instance, such devices and techniques are generally manual or mechanical in nature that require constant user intervention to make adjustments in the amount of light being allowed to pass through and/or require other user intervention associated with their use. For instance, a user would have to repeatedly take off or put on sunglasses as the lighting conditions change. Similarly with blinds or curtains, the user would have to constantly adjust the openings of the curtains/blinds as lighting conditions change, so as to ensure that a desirable and comfortable amount of light is entering the room. With dimming mirrors in vehicles, the dimming affects the entire surface of the mirror, thereby possibly and undesirably reducing the visibility of other portions of the reflected image (outside of the other cars' headlights). That is, there may be undesirable visual field loss and reduced acuity due to darkening of the entire field of view.

BRIEF SUMMARY

An aspect provides a method to reduce a maximum light level incident on an eye of a user. The method comprises:
capturing an image of a scene that is being seen by the user;
processing the captured scene image to show only bright areas; and
applying an electrical signal to a region of an active medium to change an opacity, reflectance or other optical characteristic of at least a portion of said active medium that corresponds to said bright areas.

Another aspect provides a system to reduce bright light incident on an eye of a user. The system comprises:
a scene camera to capture video of a scene that is being seen by the user;
a processor coupled to the scene camera to process the captured scene in real time to identify any bright spots and to blank other portions of the scene; and
an active medium to receive an electrical signal.

Said active medium of one embodiment is coupled to the processor and has a plurality of electrically addressable regions that can change their opacity in response to an electrical signal, wherein the processor is adapted to map any identified bright spots to one or more display regions of said active medium that correspond to the identified bright spots and to further apply said electrical signal to darken said regions.

Said active medium of another embodiment is coupled to said camera to receive the captured scene image, the active medium having capability to display a video of said scene in a manner to partially block a view of the scene behind a transparent display of the said active medium so as to prevent said bright areas from reaching said eye.

Still another aspect provides an apparatus, comprising:
a scene camera to register low resolution video of a scene in high contrast; and
an active medium to display said video in a way to block out bright parts of said scene.

An aspect provides a method to reduce a maximum light level incident on an eye. The method comprises:
capturing a scene image that is being seen by the eye;
processing the captured scene image to identify any bright spots;
mapping each identified bright spot to an active medium having a plurality of electrically addressable regions to identify at least one of said regions that correspond to the identified bright spot;
capturing an image of the eye;
processing the captured image of the eye to identify a position of the eye;
using the identified position of the eye to adjust a position of an opaqued spot to a different region of a display area if needed; and
applying an electrical signal to said identified region of the active medium to change its opacity, wherein this darkened area may be part or all of the display area.

According to another aspect, an article of manufacture comprises a machine-readable medium having instructions stored thereon that are executable by a processor to reduce maximum light level incident on an eye, by:
capturing a scene image that is being seen by the eye;
processing the captured scene image to identify any bright spots;
mapping each identified bright spot to an active medium having a plurality of electrically addressable regions to identify at least one of said regions that correspond to the identified bright spot;
capturing an image of the eye;
processing the captured image of the eye to identify a position of the eye;
using the identified position of the eye to adjust a position of said identified at least one region of the active medium; and
applying an electrical signal to said identified at least one region of the active medium to change an opacity of said identified at least one region, said at least one region having the change in opacity being less than an entire region of said active medium.

According to still another aspect, a system is provided to reduce maximum light level incident on an eye. The system comprises:

a scene camera to capture an image of a scene that is being seen by the eye;

a processor coupled to the scene camera to process the captured scene image to identify any bright spot;

an active medium coupled to the processor, the active medium having a plurality of electrically addressable regions that can change their opacity in response to an electrical signal, wherein the processor is adapted to map each identified bright spot to at least one of said regions that correspond to the identified bright spot; and electronics coupled to the processor and to the active medium to generate said electrical signal, said electronics being adapted to apply said electrical signal to said at least one region of the active medium to change an opacity of said at least one region, said at least one region having the change in opacity being less than an entire region of said active medium.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged/reduced and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1:
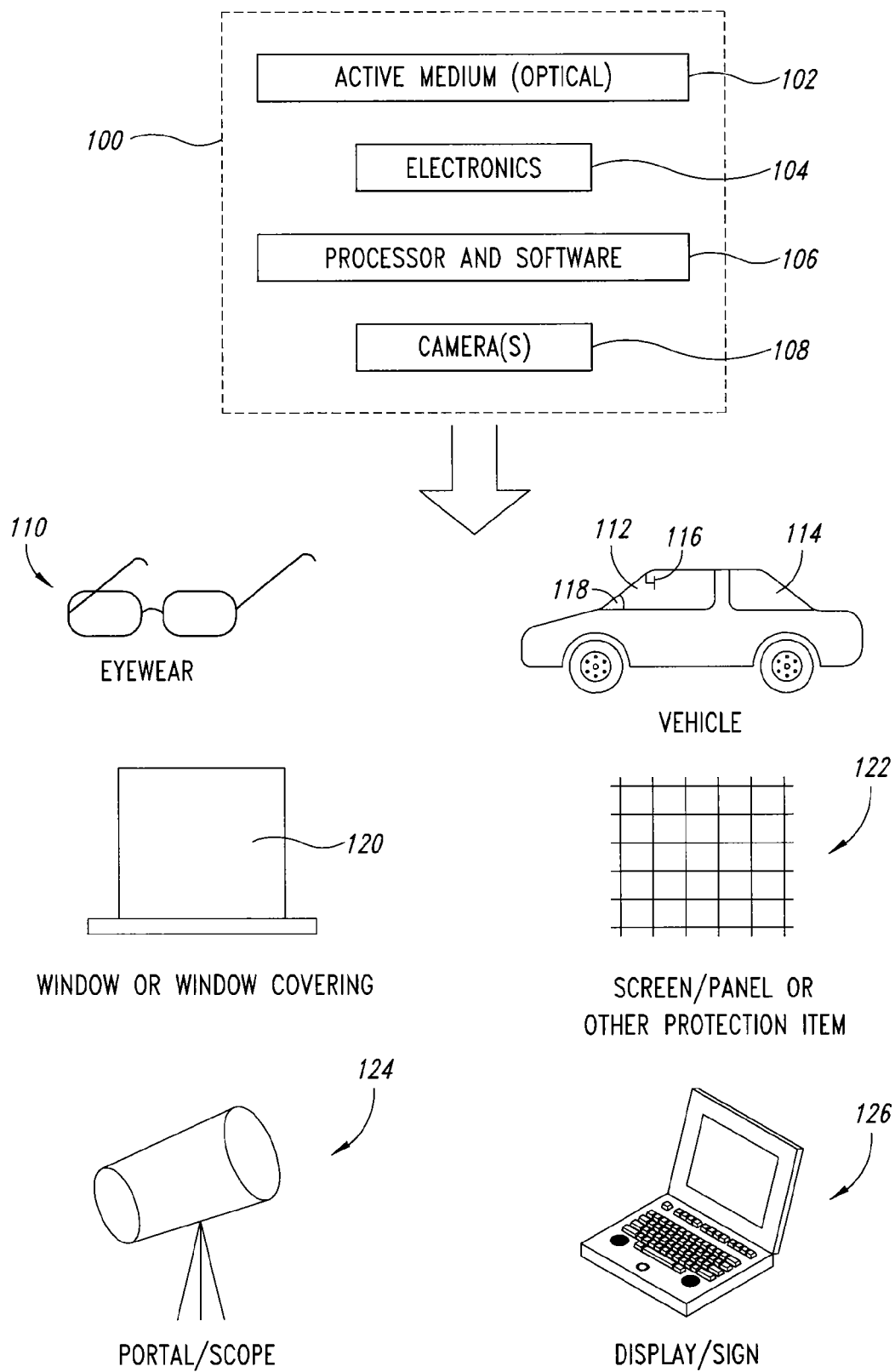
FIG. 1 shows an embodiment of a system and examples of items that can implement said system.

In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Various embodiments described herein relate to eyewear, windows, or other devices that provide shielding from light automatically and electronically. These devices will not impair vision like dark sunglasses or sun shades. More particularly for example, one embodiment provides a shadow only on the eye of the user—sunlight is blocked from or otherwise reduced in getting in the user's eyes. This feature will be very helpful, for instance, to drivers heading into a setting or rising sun. Another embodiment also cuts down the glare from headlights. Truckers and bus drivers, as well as drivers in general, can appreciate this feature. The various embodiments disclosed herein will also be very useful for active people who need to see detail in the shade, while out in the sun, without suffering from the glare due to sunlight.

One embodiment relates to a lens or window or other device fitted with an active medium. The device has an optical field of view, such as a view port through which light normally passes. The embodiment has the ability to quickly "blot out" or otherwise reduce the glare from the light and to keep the light hidden even while the user is being active. The device can be used in connection with a vehicle's windshield or other window to protect the driver from blinding light in one embodiment. Part or all of the window may be fitted with the active medium. The rear-view mirror can also be fitted. In other embodiments, eyeglasses in various formats (such as prescription eyeglasses, sunglasses, contact lenses, or other eyewear) can be provided with the active medium so as to provide such eyewear with the capability to electronically shield the eyes from sunlight. Goggles, face shields, or other type of optical element of headgear also can be fitted with the active medium and electronics so that part or all of the optical element can be darkened quickly and cleared again as needed.

As described above and herein after, the active medium and electronics and other components can be combined with eyewear for full protection from sunlight, but with limited visual field loss, and full acuity allowed where needed. Helmets or other types of headgear can also be fitted with the active medium and electronics and other components, along with their other existing optical systems.

The following is thus a non-exclusive and non-exhaustive list of implementations according to various embodiments and are depicted in FIG. 1:

1. An active system 100 to provide protection for the user's eyes from bright lights;

2. A product implementing said system 100 and using an active medium 102, such as an optical quality medium, and electronics 104 for modulating the light in spots for said active system 100. The active medium 102 of one embodiment is an electrochromic (EC) element that can be controlled by said electronics 104, said electronics 104 providing capability for monitoring, adjusting, and limiting the light. A processor and software 106 executable by the processor may be provided in one embodiment, in addition to the electronics 104. In other embodiments, the active medium 102 is a clear liquid crystal (LCD) display rather than an EC element;

3. Said product implementing said active system 100 may be a device using eye and/or scene cameras 108, as well as said active medium 102 and electronics 104. There may be more than one physical part to this device according to various embodiments;

4. Eyewear 110 using said device having the camera(s) 108, active medium 102, and electronics 104. This eyewear can include helmets, eyeglasses, hoods, goggles, or other wearable item (such as through the use of a frame) and other wearable or fixed mounted devices. The camera(s) 108 and/or electronics 104 can be permanently or removably affixed to the frame or elsewhere;

5. Windshields 112 or other window element using said device having the camera(s), active medium, and electronics. These embodiments can include any window 114 (vehicle or non-vehicle, such as a building) or window covering 120 (part or full coverage, removable or fixed, for example, such as a screen, blinds, curtain, etc.);

6. Rear-view mirrors 116 or side-view mirrors 118 in vehicles or other types of mirrors using said device having the camera(s), active medium, and electronics. These embodiments can include all mirrors not just those in motorized vehicles;

7. Said device described above having the camera(s) 108, wherein there are multiple scene-camera to help "predict" the appearance of a bright light before the light hits the active medium. For example, the predictive capability can be helpful while driving on a curvy/hilly road at night or during a bright day;

8. The eyewear 110 described above can include prescription lenses, wherein the prescription lenses are permanently affixed to or removable from the frame;

9. Any view-port, screen, window, mirror, panel, or separate protection item 122 using the device having the camera (s) 108, active medium 102, and electronics 104, wherein a portion of that is less than the entire viewing area is provided with the protection from light. In other embodiments, the entire viewing area can be provided with the protection from light;

10. Any viewer, portal, scope, or any device 124 into which the user looks, that is using the device having the camera(s), active medium, and electronics;

11. Any surface, sign, panel, or area 126 covered to provide eye protection. This provides reduction of reflections, such as on a car hood, sign, store window, or video display. Scene and eye cameras will be looking in the same general direction—one close by the user's eye and one far enough away to get a clear view of all the unwanted sources of light;

12. Said device 124 and/or area 126 may also include any light, projector, scope (such as a telescope or microscope), advertisement, display, or any source of light that is using the device having the camera(s), active medium, and electronics. This device will prevent the light from illuminating people's faces, and thus, the viewer will not see the glare; and 13. In the various embodiments described above and below, protection can be provided for a portion of or all of the possible viewing angles. The range/scope of the protection can be determined based on the view provided by the scene and/or eye camera(s). The number of people that may be protected can also be determined by the number of spots provided, which determines the region of protection.

Figure 2:
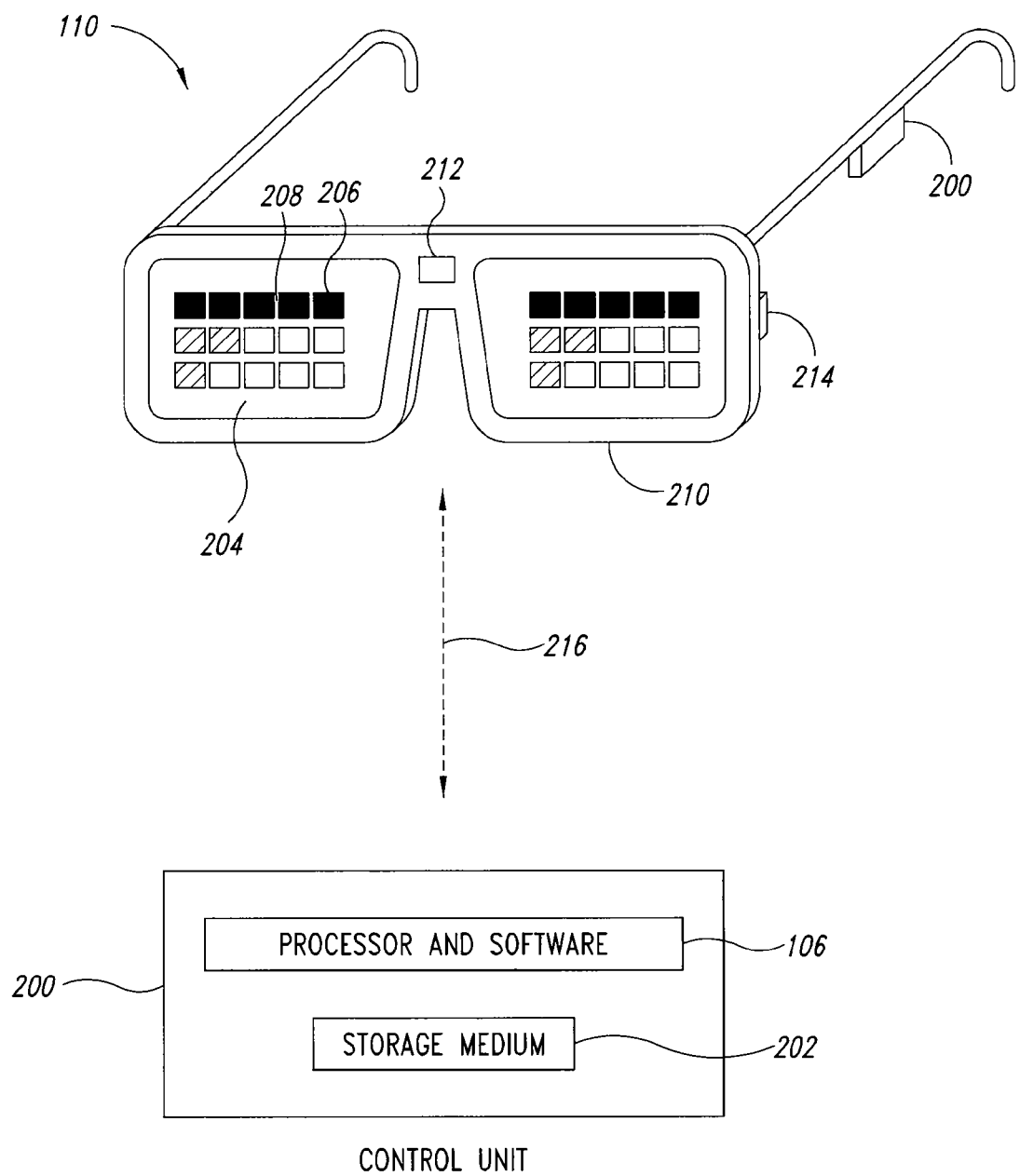
FIG. 2 shows an example eyewear that can implement an embodiment of the system of FIG. 1.

FIG. 2 shows an example embodiment of the eyewear 110 implementing the system 100. The eyewear 110 is shown and described herein purely for purposes of explanation in the form of eyeglasses (including sunglasses)—the various features of the system 100 associated with the eyewear 110 can be adapted appropriately for the other items shown and described with respect to FIG. 1, by a person skilled in the art having the benefit of this disclosure.

The embodiment shown in FIG. 2 includes the camera(s) 108 in the form of at least one eye camera 214 and at least one scene camera 212, the electronics 104 of which some are present in a control unit 200, the active medium 100 integrated with lenses 204 of the eyewear 110, and mounting hardware on a frame 210. The eyewear 110 implementing the system 100 can include other components, which are not shown or described herein in detail, for the sake of brevity.

The eye camera 214 and the scene camera 212 can be embodied by any appropriate miniature size, low weight, suitable resolution camera or other image-capturing device. For example, there are commercially available cameras or other image-capturing products that can provide the minimized size and weight to allow such products to be mounted on the frame 210, without adversely affecting weight, comfort, aesthetic appearance, etc. of the eyewear 110. An example position of the scene camera 212 is at a bridge area of the frame 210, so as to allow the scene camera 212 to capture an image that is being seen by the user. An example position for the eye camera 214 on the frame 210 is along the periphery of the lenses 204 where an image of the user's eye(s) can be accurately captured. These positions are merely illustrative, and may vary from one piece of eyewear to another, based on factors such as frame style, weight distribution, mounting stability, ergonomics, etc.

The lenses 204 can comprise prescription lenses or non-prescription lenses. In one embodiment, the active medium 102 is integrated with the lenses 204. Such integration 204 can include layering the active medium 102 on a surface of the lenses 204, providing the active medium 102 as the material for the lenses 204 themselves, mechanically coupling the active medium to the lenses 204, etc. In other implementations, the active medium 102 may be placed proximate to an optical element (such as eyeglasses, windows, displays, mirrors, etc.) without necessarily being coupled to said optical element.

The active medium 102 of one embodiment comprises an electrochromic (EC) element having regions that change their opacity and/or color in response to electrical stimulation, such as the application of voltage. In the embodiment of FIG. 2, said regions can comprise a plurality of EC regions 206 arranged in a matrix across each lens 204.

The EC regions 206 may be separated from each other by non-EC regions 208 by a certain distance that may vary from one implementation to another. The non-EC regions 208 that separate the EC regions 206 may be permanently blackened to some degree to improve protection in one embodiment. An example matrix arrangement of the EC regions is 5×3, such as shown in FIG. 2. An example shape of each EC region 206 is square, with an overall surface of approximately ¼ inch square for each EC region. It is appreciated that such specific configurations are merely illustrative and not intended to be limiting. For example, other embodiments may have different shapes for each EC region 206 (e.g., rectangular, circular, elliptical, circular, triangular, polygonal, or a random shape), different matrix size and matrix layout, different number of total EC regions in the lens 204, different separation or contiguity between the EC regions, different size of each EC region 206 (e.g., larger or smaller than ¼ inch square, such as the granularity of pixels), and so forth. In some embodiments, the EC regions 206 are present across substantially the entire region of the lenses 204. In other embodiments, the EC regions 206 are present in only a subset/portion of the entire region of the lenses 204.

Each of the EC regions 206 can be electrically addressable and electrically actuated, such that a subset (less than or equal to all of the EC regions 206) can be electrically actuated. Electrical actuation in one embodiment results in an increase in opacity (e.g., darkness) of each EC region 206, thereby resulting in a "dark spot" where such actuated EC region(s) 206 is located. For example in FIG. 2, each lens 204 have their EC regions 206 at the upper region and left region actuated, thereby resulting in such EC regions 206 generating "dark spots," while the other EC regions remain substantially transparent or otherwise have lesser opacity. Such a situation may occur, for example, if a bright light is present directly over and to the left of the user of the eyewear 110, thereby producing more glare over the upper and left regions of the lenses 204 as opposed to the lower regions.

In one embodiment, application of the voltage or other electrical signal from the electronics 104 results in the increase in opacity. The degree or different levels of opacity may be controlled by the duration and/or amplitude and/or form and/or frequency of the applied electrical signal. In other embodiments, application of the electrical signal provides a simpler result: completely opaque or completely transparent. In yet other embodiments, the duration and/or amplitude and/or frequency of the applied electrical signal can control a change in color (RGB, for example) of the EC regions 206, the rate and degree of change of the level of opacity of the EC regions 206, the switching ON/OFF of the opacity of the EC region 206, and so forth.

Examples of EC materials (and methods for manufacturing thereof) that can be used for the active medium 102 to provide the EC regions 206 and which can be implemented in the system 100 are described in U.S. Patent Application Publication Nos. 2002/0196518, 2004/0143091, 2005/0157369, and 2005/0200935. All of these documents are incorporated herein by reference in their entireties.

The active medium 102 of one embodiment is clear and of optical quality. Its opacity is adjustable over a wide range, and can adjust for example, from clear to opaque (e.g., nearly black) very quickly (such as at a rate of 1/30th of a second); and can return most of the way back to its non-opaque condition nearly as quickly (e.g., within tenths of a second); and return completely back to its non-opaque condition in seconds. In one embodiment, EC regions 206 may be "nudged" or otherwise activated in groups including the whole row and/or whole column that one EC region to be activated is in. This electrical nudging will require far fewer connections and wires on the active medium 102 but has some unwanted optical effects. On the other hand, direct activation for another embodiment will require at least 2 wires for each cell/pixel/EC-region 206.

In another embodiment that will be described later below, liquid crystal display (LCD) technology with electron transport enhancers may be used or adaptable as the active medium 102 for protecting against light, alternatively or additionally to EC technology. Various embodiments are described herein in the context of EC technology, because EC materials appear to be more practical for eyeglasses. EC technology probably will become more practical for windshields also. EC technology is advantageous in that it is of lighter weight, flexible, cheaper to produce, and draws less power than using LCD for the active medium.

The electronics 104 to control the active medium 102 may be present within or on the lenses 204 and/or frame 210 and also in part in the control unit 200, which also operates the cameras 212 and 214. In some embodiments this control unit 200 can contain one or more batteries and some switches/buttons. The control unit 200 may be mounted to the frame 210 (such as shown in FIG. 2), or alternatively remotely coupled to the eyewear 110 via a communication link 216. Size, weight, ergonomics, aesthetics, technical considerations, and other factors may determine whether the control unit 200 is to be mounted on the frame 210 or to be remotely coupled.

The control unit 200 may communicate or otherwise control/interface with the cameras 212/214 and active medium 102 via one or more hardwire connections and/or one or more wireless connections. Thus, the communication link 216 can be wireless or hardwire. Examples of wireless connections are the Bluetooth standard, optical links, radio frequency (RF) links, or other standards and wireless techniques.

The control unit 200 of one embodiment includes one or more processors 106 to control operation of the cameras 212/214, to process the images captured by the cameras 212/214, to control actuation of the EC regions 206 using the electronics 104 and based on the processed images, and/or to control adaptation of the actuation of the EC regions 206 (based on changing light conditions, user eye movement, prediction of images, and so forth), and/or to perform other calculations and operations. In one embodiment, the processor 106 is adapted to execute machine-readable instructions, such as software, stored in a machine-readable storage medium in order to perform such operations and calculations. In some embodiments, such as an analog embodiment for example, the control and analysis may be done by the camera and display with no additional components needed for basic functioning. Other components may be included for ease of use.

Figure 5:
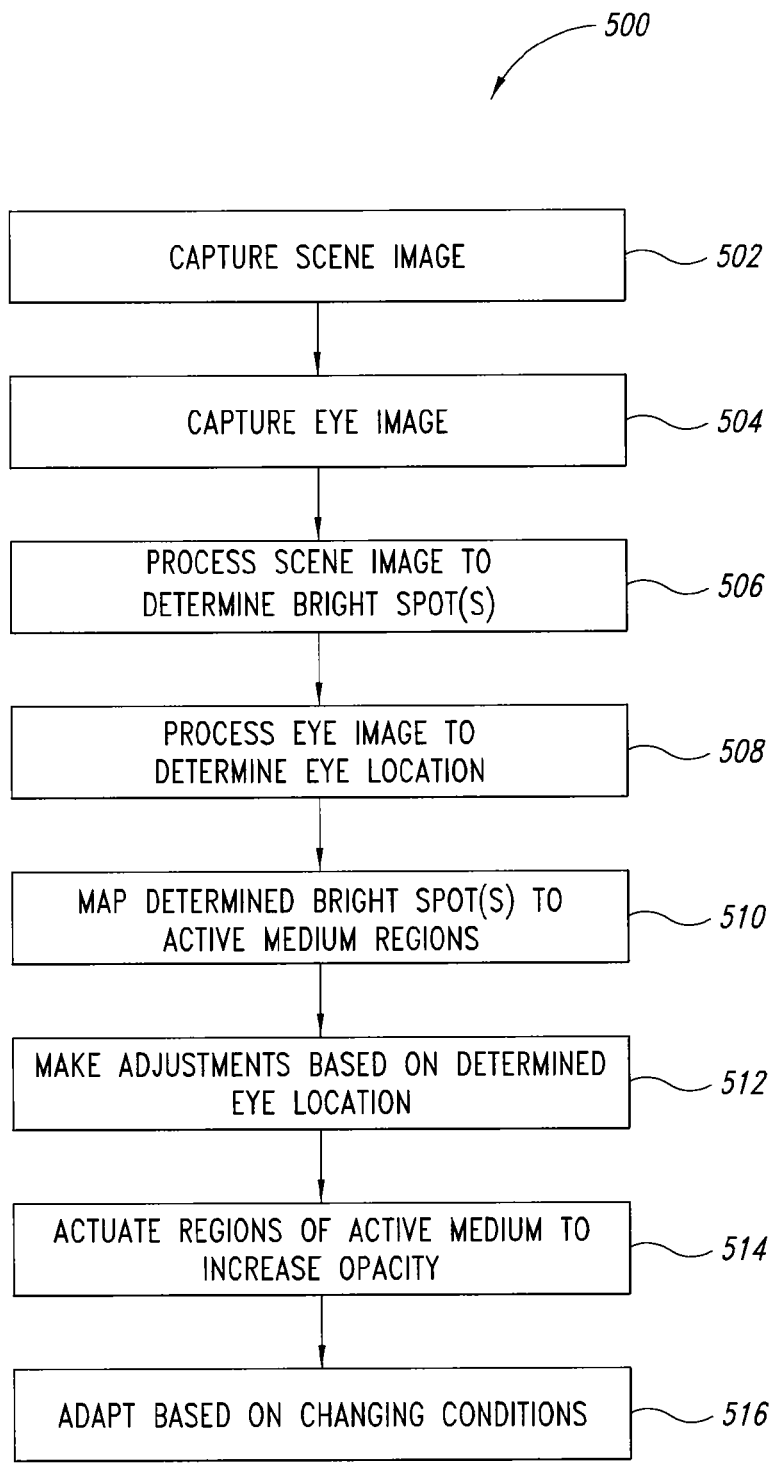
FIG. 5 is a flowchart of a method that can be implemented in the devices and systems of FIGS. 1-4.

The operation of the eyewear 110 having an embodiment of the system 100 will now be described with respect to a method depicted by a flowchart 500 in FIG. 5. In one embodiment, at least some of the operations shown in the flowchart 500 can be embodied by machine-readable instructions (such as software) stored in one or more machine-readable medium (such as the storage medium 202 in the control unit 200) and executable by one or more processors (such as the processor 106). Further, the various operations depicted in the flowchart 500 need not necessarily occur in the exact order shown, and moreover, certain operations can be added, removed, combined, modified, and/or any combination thereof.

The flowchart 500 will be described in the context of the eyewear 110 of FIG. 2. However, it is understood that the various operations depicted in the flowchart 500 and explained hereinafter can be implemented in other devices/systems shown and described herein.

First, the user typically looks through the lenses 204 having the active medium 102 at a desired scene. The scene camera 212 captures an image of the scene that the user is seeing at a block 502, and provides this captured image to the control unit 200. The processor and software 106 process the scene image at a block 504 to determine whether the brightness level in some area of the scene is too high, such as if too much light is entering the user's pupil from said area(s) of the scene. The bright areas/spots are then mapped to the EC regions 206 in the active medium at a block 510.

The brightness is reduced or removed by selectively increasing the opacity of the EC regions 206 in the area of the active medium 102 where the bright light is entering (and which maps to or otherwise corresponds to said bright areas in the scene). In one embodiment, increasing the opacity can be performed by application of one of more voltage signals to the corresponding selected ones of the EC regions 206 to actuate said EC regions 206, which is depicted at a block 514. As previously explained above, increasing opacity can be performed a number of ways, including a gradual transition to an opaque state, a substantially instantaneous switching, changing color, reflectance, light scattering, polarization, and so forth. The other areas of the active element 102 on the lenses 204 remain clear. Vision is unobscured.

To provide further refinement, the eye camera 214 can be used to capture an image of the user's eyes at a block 504, which can then be correlated with the captured scene image and/or the EC regions 206 to determine which EC regions 206 are to be optimally made opaque. For example, the eye image can be processed at a block 508 to determine the position of the user's eye(s), and then this positional information can be used to determine which ones of the EC regions 206 to make opaque. Thus, a more accurate determination can be made as to which EC regions 206 to make opaque based on the processed scene image and based on the eye position. For instance, if only the bright spots in the scene image is used to make the corresponding EC regions 206 opaque, then such operations may not necessarily optimally block out the sun, if the user's eye(s) are looking or has otherwise moved in a different direction than in the previous image frame. Thus, use of both eye and scene images allow for compensation of eye movement, thereby providing adjustments in the selection of appropriate ones of the EC regions 206 to make opaque.

One or more spots are displayed on the active medium 102, as needed, at the block 514. Adjustments to provide dynamic adaptation can then be performed at a block 516. For example, the position of the bright spot(s) to block out is re-calculated every 1/30 of a second or more often. This adjustment prevents flicker from movement of the viewer such as on a bumpy road, or other effects, by allowing the opaqued EC regions 206 to "move" to compensate for the movement of the bright lights.

The black dot(s) generated by the opaqued EC region(s) 206 casts a shadow on the eye. In various embodiments, the spot size can be automatic, manually adjusted, or fixed. The number of lights that can be covered may also vary from one embodiment to another. To improve performance, there may be adjustment knobs, buttons, or other user input device in the control unit 200 to allow control over the size and number of spots allowed and for the speed of response.

If it is bright enough, the brightest light source will be covered in one embodiment, although in some embodiments its shape is not considered, so some light may get thru around the edges of the black spot formed by the EC region(s) 206. An example is a bright large reflection off the hood of the car. In some embodiments, the level of luminosity required to trigger a spot's creation and its removal may be user adjustable/configurable. There may also be capability to pick the level of opacity of the spot as needed in one embodiment. For instance, a user may not want to block headlights entirely, but may want to completely block stadium lights while watching a game. Users may be provided with the ability to pick the duration in which the spot lingers and the speed of fading. In other embodiments, such as in helmets or on windshields, multiple scene cameras (described with respect to FIG. 3) may help "predict" the appearance of a bright light before the light hits the user's eyes.

In an embodiment the electronics 104 and/or the processor and software 106 controls the system 100. The scene is quickly scanned and analyzed at blocks 502 and 506, for example, by saving the raster scan from the scene camera 212 into memory and then amplifying the individual pixel intensity levels. Then, all values not at a maximum intensity level and/or that do not otherwise meet some predetermined threshold intensity levels are deleted. The resulting map will thus show just the bright spots, and this map is converted to the coordinates of the matrix of EC regions 206 of the active medium 102. Then, adjustment for the movement of the user's eye(s) is performed at the block 512, and black/opaque "pixels" (e.g., the actuated EC regions 206) are provided to cover all the bright spots at the block 514.

The eye movement adjustment at the blocks 508 and 516 may be done by three-dimensional (3D) modeling or in just a few 2D re-mappings, according to various embodiments. Eye position is determined by using the eye camera 214. The user may wear a light source or reflector to direct the eye camera 214 to the face in some embodiments. Alternatively or additionally, face recognition software can be used. If needed, an invisible spot (such as from said light source that generates a light that is generally imperceptible by the user) may be reflected off the cornea by the eye camera 214, so as to provide the appropriate range finding, focusing, locating, etc. The position change of this or some other spot can then be related to the position change of the eye. This is because the center of curvature of the cornea is not the same as the center of movement of the eyeball. The eye camera image can be processed in a different manner or just like the scene camera. Then the 3D eye position can be determined, if needed for 3D modeling; or the 2D change can simply be applied to adjust the spot's initial position on the display's pixel map.

As explained above, there is an eye camera 214 that is provided to detect changes in the position of the user's eye(s). The eye camera 214 will record the reflections off the cornea in one embodiment. If the user wears eyeglasses, the eye camera 214 can be clipped to the frame 210 as explained above or integrated with the frame 210 itself. In an embodiment, only one eye will be viewed by the eye camera 214, while in other embodiments one or more eye cameras 214 can be used to image both eyes. The eyewear 110 can be configured electronically or mechanically for eye separation and height from the nose bridge position. In other words, the position of each lens' 204 zero-point/origin may be automatically or manually adjusted for each new user's face.

The eye camera 214 is used to sense twitches and gaze changes. The spot will be moved the same amount and the same direction in one embodiment, so the shadow stays on the pupil of the eye. In embodiments involving windows, mirrors, etc., there may be two spots/regions produced respectively one for each eye, or one horizontal stripe may be produced to cover both eyes if the light source is big and far away. In window, mirror, display, sign, etc. embodiments, each eye position can be calculated separately so that the system 100 will function even if the user tilts the head and/or turns to one side. In these embodiments, there may be another camera just looking at the tilt of the user's head, so as to simplify the raster/pixel calculations. Face or eye detection software may be used in some embodiments to locate the number of users and their locations, using a head camera. Also head movement, for example bouncing around on a bumpy road, can be compensated.

In an embodiment, a one-time manual adjustment can be performed, so that the opaque spot(s) is seen in exactly the proper place in each area of the active medium 102. This feature may be useful, for example, if the lenses 204 are prescription lenses or the surface on which the active medium 102 is integrated is curved. An example would be wraparound sunglasses.

At the blocks 510-514, placement of the black spot (regions to block the light) is determined. When a bright source is detected, its position is determined from the raster scan (or other image processing) from the scene camera 212. The spot is displayed in the same position on the active medium 102, with adjustment for size and alignment differences between the raster scan of the scene image and matrix layout of the EC regions 206. In the eyewear embodiments, such mapping can be preset. In the other embodiments (such as those in involving window/windshield/mirrors), calculations are performed at the blocks 510-516 to determine these adjustment values using 3D modeling or other suitable technique. This adjustment can be done each second, for example, or less often as needed for a particular window geometry.

For the eyewear embodiment, the line on which the light is entering the scene camera 212 is known (because it was focused by a lens of the scene camera 212). Then, once the system 100 determines the position of the eye at the block 508, a parallel line can be calculated from the eye to the active medium 102. At that position, a spot can be created to block the light. This provides protection.

For the window/mirror embodiments, the position of the eye is known to be somewhere on a line sensed by an eye camera; the position of the light source is known to be somewhere on a line sensed by a scene camera (both can be approximated depending on previous positions); and the position of the active medium 102 is known (preset). Then, the position of the needed spot is calculated using 3D modeling in one embodiment. The distances along the two lines are adjusted until the minimum number of bright spots is reflected off the cornea of the user. At that point, protection is provided.

Accordingly with the embodiment of FIG. 2, advantages over standard sunglasses are provided. For example, most sunglasses darken the entire field of view. For an active person, this can be a problem. The embodiment of FIG. 2 provides clear vision with good protection from glare, by selectively blocking/reducing the light in regions of the lenses 204, said regions being less than the entire field of view region of the lenses 204.

Figure 3:
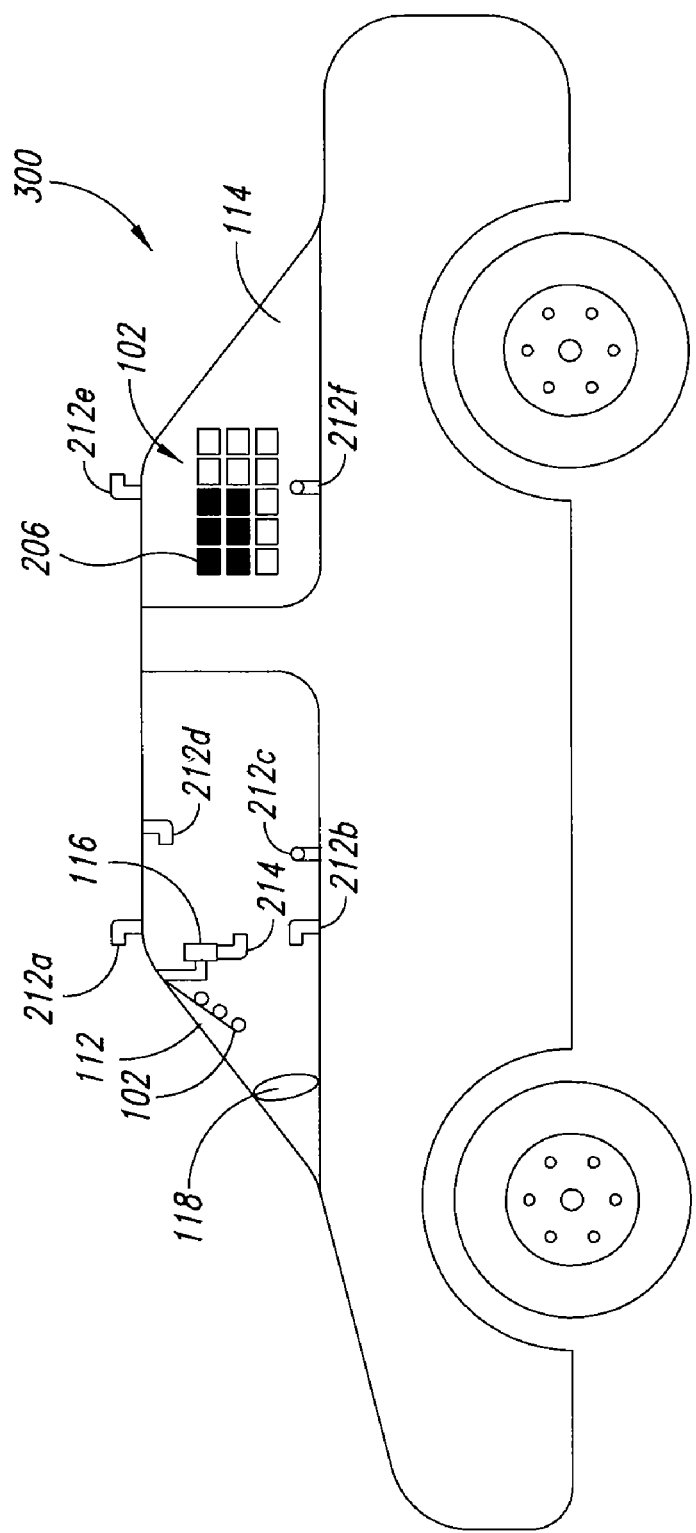
FIG. 3 shows an example vehicle that can implement an embodiment of the system of FIG. 1.

FIG. 3 illustrates implementation of the system 100 in a vehicle 300, such as a car. The features described above with respect to the eyewear 110 can be adapted for use with the vehicle 300 and/or with the other items shown in FIG. 1, and therefore will not be described in complete detail again herein.

In FIG. 3, there are various optical elements that can reflect or transmit light that may be bothersome to the driver/passengers. These elements are the windshield 112, any of the windows 114, the rear view mirror 116, and the side view mirror(s) 118. Accordingly, each of these elements is provided with the active medium 102, such as EC material having the EC regions 206 as described above. The active medium 102 can be integrated into the material of the windshield 112, any of the windows 114, the rear view mirror 116, and the side view mirror(s) 118, and/or the active medium 102 can be embodied as a screen to overlay such elements. For mirrors, this overlay could be adjustable in its positioning to manually make the display align with the view in that mirror. This would be useful when a new driver enters the car.

In one embodiment, more than one scene camera 212 is provided to capture scene images. For example, a camera 212a captures the scene in front of the windshield 112; a camera 212b captures the scene reflected to the driver by the side view mirror 118; a camera 212c captures the scene in front of the driver side window; a camera 212d captures the scene reflected to the driver by the rear view mirror 116; a camera 212e captures the scene out the passenger side window; a camera 212f captures the scene out the rear window; and so forth. These cameras may be shared by other companies' systems in some embodiments. An example could be the backup aid view camera from Voyager or from Observer companies. Dark spots will only be produced in one embodiment when someone looks at or near a window. Any dark spots produced for passengers will be dimmed by an embodiment when the driver looks at that window (and their own spot(s) will shown up). Appropriate eye and scene cameras are installed for this functionality.

In the case of mirror views, the camera could be looking at the scene in front of that mirror and be baffled to see only a view the shape of the mirror: either round, rectangle, triangle, or odd shape as appropriate. If this were done electronically, the view could also be shifted to align with what the driver sees in that mirror. This shifting of baffle would be done by the processor with 3D modeling techniques and would use input from the relevant eye camera 214. When aligned for this driver, the active medium on the mirror would block/reduce bright light from entering the driver's eye from that mirror.

One or more eye cameras 214 are provided to capture the eye position of the driver and other passengers. The eye cameras 214 can be positioned at any suitable location. For the sake of simplicity of illustration, only one eye camera 214 positioned on the rear view mirror 116 is shown in FIG. 3, said eye camera 214 being usable to capture the eye position of the driver for adjusting the active medium 102 in various displays to block/reduce light from the various optical elements in the front of the vehicle 300 (this includes the rear view mirror). Other eye cameras are used for left and right Side elements of the vehicle 300 (this includes side view mirrors).

The various embodiments described above can be considered as a "digital" solution for protecting a user's eye(s). An embodiment of an "analog" or "quasi-analog" solution is shown in FIG. 4.

Figure 4:
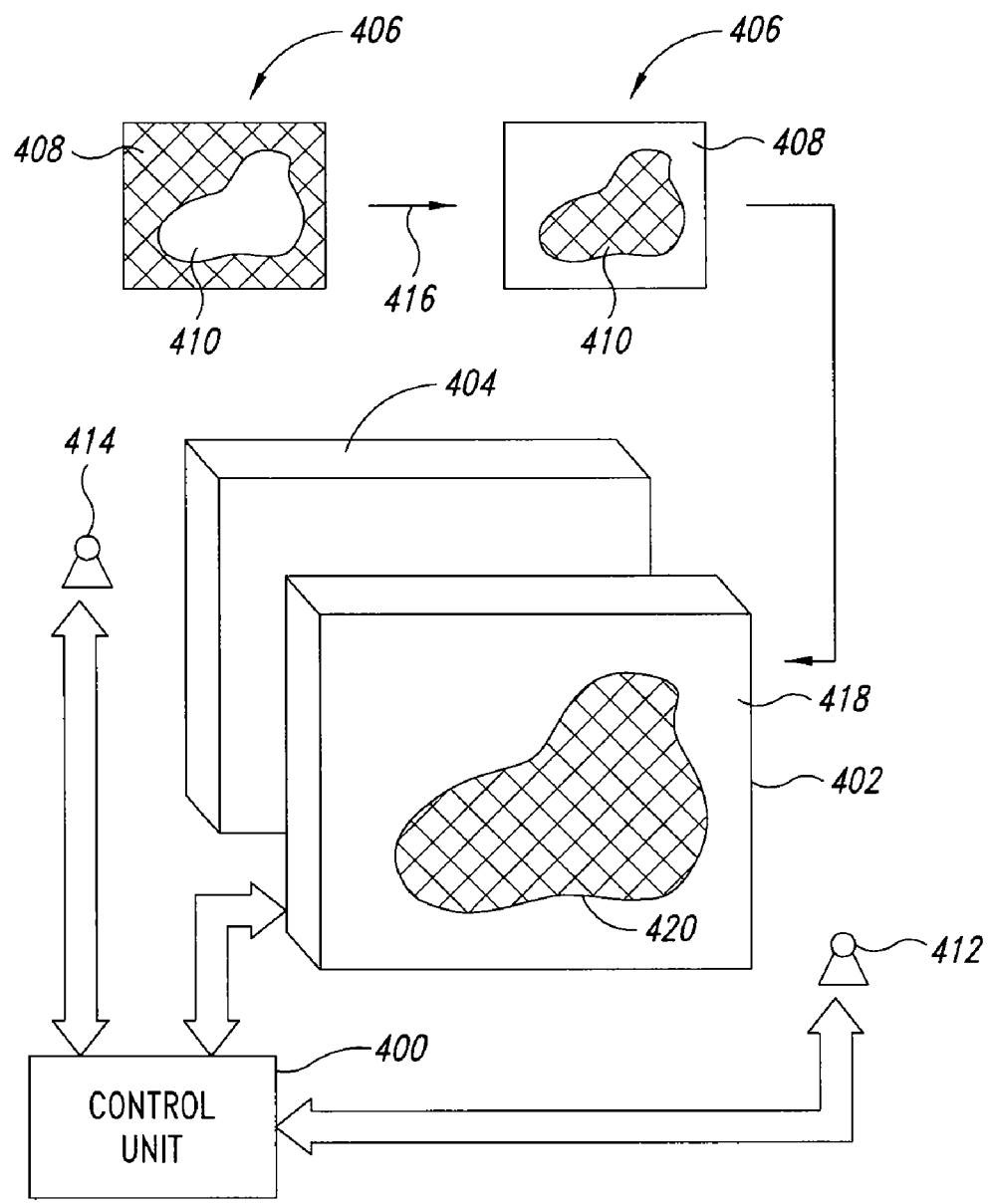
FIG. 4 is a diagram illustrating another embodiment using analog circuits instead of digital processing.

In the embodiment of FIG. 4, a control unit 400 (similar in some respects to the control unit 200) is provided. The control unit 400 is communicatively coupled (via wireless and/or hardwire links) to a transparent electronic screen 402. The transparent screen 402 can be a transparent LCD screen, for example, such as those that can implement technology for overhead projection systems.

In the embodiment of FIG. 4, the screen 402 is positioned on or over an object 404. The object 404 can be, a window, eyewear, mirror, and/or any of the items described with reference to FIG. 1. One or more scene cameras 412 are provided, as before. Optionally, one or more eye cameras 414 may also be provided. The cameras 412 and 414 are communicatively coupled to the control unit 400 also.

In operation, the contrast level of the scene camera 412 is set high, such that a captured scene image 406 shows a bright region 408 where light is above a certain brightness threshold, and shows a dark region 408 where the light is below the brightness threshold.

An inverting process is performed at 416 to modify the scene image 406, such that the region 408 is now generated as a clear region by the display 402 and the (previously bright) region 410 is now generated as a dark or otherwise increased opacity region.

The thus modified scene image is now displayed on the screen 402, thereby blocking/reducing the glare from light in the screen region 420 corresponding to the region 410, while the other region 418 (corresponding to the region 408) remains clear or otherwise substantially unobscured.

This provides an analog display that simulates the digital display. These regions are not physical nor pre-formed as are the EC regions of the digital display. Thus, the analog system provides more flexibility in display and is easier to hook-up. The hybrid (or quasi) part-analog-part-digital system can provide multi-camera functionality, including eye camera usage.

As before, the eye camera 414 may be provided to allow adjustments (such as size and positional changes) of the opaque region of the screen, based on changes in the position of the user's eye(s) due to movement or other influences.

The shape, duration, size, frequency, transitional times, etc. of the opaque region on the screen 402 may be varied, as previously described above with other embodiments.

Other features of additional embodiments corresponding to the analog implementation of FIG. 4 include:

An embodiment of the system can have an auto shut OFF timer to save batteries.

The device of some embodiments has an ON/OFF control or auto-shut-OFF and an ON button, such as provided via the control unit 400. There may also be a control in the control unit 400 for brightness to set how bright an object needs to be to activate a spot 420. In an embodiment, the spot 420 prevents viewing of lighted objects/scenes, while other embodiments allow some level of transparency.

Various details of embodiments of the system 100 are provided below:

Automatic dark eyeglasses or goggles are provided that are mostly clear but shade the user's eye(s) from bright lights, such as sun or headlights. An embodiment places a shadow over the source of the bright light (for example, over the sun when emerging from a tunnel) but will not impact the rest of the user's vision. The system 100 provides at least two advances over existing technology:

1. Speed of reaction—the darkening effect can occur in a $\frac{1}{30}^{th}$ of a second or faster or as adjusted by the user; and/or
2. Coverage—the darkening will affect only the area of the source of the bright light—not the entire field of view, unless desired.

An embodiment includes cameras to observe both the sources of bright light and positioning of head and eye. Computer algorithms can be used in either partially digital or all-digital versions to position the shadow effect and to dynamically adjust the positioning as the relationship between light source and viewer changes.

Applications for the various embodiments can include but not limited to the vehicular field and for people working with bright lights (doctors, welders, television crews, film producers, for example). Hence, the following are example and non-limiting industries where systems may be produced: truck manufacture, car manufacture, glass manufacture, eyeglass developers, safety eyeglasses manufacture, and others.

For "indirect activation' systems, the EC display with 3 rows of 5 spots each uses 8 wires to connect the controller. There is one connection for each "row" on one side of the film and one wire for each "column" on the other side. This uses an indirect activation by a voltage system that has some small side effects (not described here) that are mitigated in one embodiment. Other embodiments can provide more than 15 different spot positions (EC regions 206) that are selectable as ON indirectly by row and column. 19 wires could connect a display with a 9 by 10 resolution providing 90 individual cells (EC regions 206) or pixels.

A "direct activation" matrix of 15 EC regions 206 may use at least 16 "wires" connected and routed on each side of the film, for a total of over 32 connections. The analog and partly analog embodiments use only 4 wires and produce much higher resolutions, easily above 640×480 pixels (positions for the spot).

An embodiment of the system 100 can easily run on batteries for extremely long periods. This is because the electrochromic (EC) display does not use any power when sitting in either ON or OFF states. Power is only used when changing the state of an EC region 102.

An embodiment of the system 100 can have an AutoOver-Ride to clear the display on a POWER FAIL. This feature is useful for the EC display because a spot would stay ON for a month or other extended period of time after power is removed. This would be annoying when the batteries die. Capacitors can be provided on the display's edge to discharge their charge into all regions 206 that are ON (thus turning them OFF) at the time power is cut (due to a broken line or a nearly dead battery.) This is a safety issue with some EC displays.

All of the above-mentioned U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method to reduce a maximum light level incident on an eye, the method comprising:

capturing a scene image that is being seen by the eye;

processing the captured scene image to identify any bright spots;

mapping each identified bright spot to an active medium having a plurality of electrically addressable regions to identify at least one of said regions that correspond to the identified bright spot;

capturing an image of the eye;

processing the captured image of the eye to identify a position of the eye;

using the identified position of the eye to adjust a position of said identified at least one region of the active medium;

applying an electrical signal to said identified at least one region of the active medium to change an opacity of said identified at least one region, said at least one region having the change in opacity being less than an entire region of said active medium; and automatically clearing the identified at least one region of the active medium in response to a power failure.

2. The method of claim 1 wherein applying the electrical signal to said identified at least one region of the active medium to change the opacity of said identified at least one region includes applying a voltage signal to an electrochromic (EC) region of the active medium.

3. The method of claim 1 wherein changing the opacity of said identified at least one region includes changing a color, shade, hue, gamma, clarity, transmittance, light scattering, polarization, other optical characteristics, attach time, decay time, shape, outline, pattern, and size of said at least one region.

4. The method of claim 1, further comprising performing adjustments on said eye or scene images based on changing conditions, including changing positions of said eye, changing scenes, changing lighting conditions, changing based on predicted or past eye and scenery changes, and manual changes by a user.

5. The method of claim 1 wherein said active medium is integrated within or on an optical surface.

6. The method of claim 1 wherein said active medium is placed proximate to an optical surface.

7. The method of claim 1 wherein applying the electrical signal to said identified at least one region of the active medium to change the opacity of said identified at least one region includes generating an opaque image on a transparent display screen.

8. The method of claim 1 wherein said active medium is placed proximate to an optical system eyepiece.

9. The method of claim 1 wherein said at least one region forms an opaque spot, the method further comprising controlling at least one of the opaque spot's duration, transition time, threshold level to turn the opaque spot ON/OFF, opacity level, size and number of said opaque spots.

10. The method of claim 1 wherein said active medium is provided in connection with any one or more of eyeglasses, a window, a mirror, goggles, windshield, a window covering, a wearable item, a scope, a panel, a sign, a display to reduce maximum intensity of the light transmitted therethrough or reflected therefrom.

11. The method of claim 1 wherein said eye and scene images are captured using at least one camera.

12. An article of manufacture, comprising:
a non-transitory machine-readable medium having instructions stored thereon that are executable by a processor to reduce a maximum light level incident on an eye, by:
capturing a scene image that is being seen by the eye;
processing the captured scene image to identify any bright spots;
mapping each identified bright spot to an active medium having a plurality of electrically addressable regions to identify at least one of said regions that correspond to the identified bright spot;
capturing an image of the eye;
processing the captured image of the eye to identify a position of the eye;
using the identified position of the eye to adjust a position of said identified at least one region of the active medium;
applying an electrical signal to said identified at least one region of the active medium to change an opacity of said identified at least one region, said at least one region having the change in opacity being less than an entire region of said active medium; and
responding to a power failure by automatically clearing the identified at least one region of the active medium.

13. The article of manufacture of claim 12 wherein the non-transitory machine-readable medium further includes instructions stored thereon to adjust opacity of said at least one region based on changing conditions.

14. The article of manufacture of claim 12 wherein the instructions to adjust opacity of said at least one region includes instructions to activate at least one electrochromic region of said active medium, or to display said processed captured scene image in said active medium.

15. A system to reduce a maximum light level incident on an eye, the system comprising:
a scene camera to capture an image of a scene that is being seen by the eye;
a processor coupled to the scene camera to process the captured scene image to identify any bright spots;
an active medium coupled to the processor, the active medium having a plurality of electrically addressable regions that can change their opacity in response to an electrical signal, wherein the processor is adapted to map each identified bright spot to at least one of said regions that correspond to the identified bright spot;
electronics coupled to the processor and to the active medium to generate said electrical signal, said electronics being adapted to apply said electrical signal to said at least one region of the active medium to change an opacity of said at least one region, said at least one region having the change in opacity being less than an entire region of said active medium, wherein said electronics are configured to respond to a power failure by restoring the opacity of the at least one region.

16. The system of claim 15, further comprising:
an eye camera coupled to the processor to capture an image of the eye, the processor being adapted to process the captured image of the eye to identify a position of the eye and to use the identified position of the eye to adjust a position of said at least one region of the active medium.

17. The system of claim 15 wherein said active medium is an electrochromic (EC) material.

18. The system of claim 15 wherein said active medium is a transparent display screen that can generate an opaque image.

19. The system of claim 15 wherein said active medium is part of any one or more of eyeglasses, window, mirror, goggles, windshield, window covering, scope, helmet, panel, sign, display that can transmit or reflect light.

20. The system of claim 15 wherein characteristics associated with the opacity of said at least one region can be adapted, adjusted, or user-controlled.

21. A method to reduce a maximum light level incident on an eye of a user, the method comprising:
capturing an image of a scene that is being seen by the user;
processing the captured scene image to show only bright areas;
applying an electrical signal to an active medium to change an opacity, reflectance or other optical characteristic of at least a portion of said active medium that corresponds to said bright areas; and
responding to a power failure by automatically restoring the changed characteristic of the at least a portion of said active medium.

22. The method of claim 21, further comprising:
capturing an image of the eye;
processing the captured image of the eye to identify changes in position of the eye; and
using the identified changes in position of the eye to make adjustments to the active medium.

23. The method of claim 21 wherein both analog and digital components are used as part of said capturing, processing, or applying.

24. The method of claim 21 wherein analog components are used as part of said capturing, processing, or applying.

25. The method of claim 21 wherein applying the electrical signal to said active medium includes applying a video signal to a transparent display so that the said processed image is aligned with but blocks out some directly visible view.

26. A system to reduce bright light incident on an eye of a user, the system comprising:
a scene camera to capture video of a scene that is being seen by the user;
a processor coupled to the scene camera to process the captured scene in real time to identify any bright spots and to blank other portions of the scene;
an active medium to receive an electrical signal; and
circuitry configured to provide power for providing signals to the active medium in response to a power failure.

27. The system of claim 26 wherein said active medium is coupled to the processor and has a plurality of electrically addressable regions that can change their opacity in response to an electrical signal, wherein the processor is adapted to map any identified bright spots to one or more display regions of said active medium that correspond to the identified bright spots and to further apply said electrical signal to darken said regions.

28. The system of claim 26 wherein said active medium is coupled to said camera to receive the captured scene image, the active medium having capability to display a video of said scene in a manner to partially block a view of the scene behind a transparent display of the said active medium so as to prevent said bright areas from reaching said eye.

29. The system of claim 26, further comprising:
an eye camera coupled to a processor to capture an image of the eye, the processor being adapted to process the captured image of the eye to identify a position of the eye and to use two identified positions of the eye to adjust position of a dark spot or video image on the active medium.

30. The system of claim 26 wherein optical characteristics of said active medium can be automatically adjusted, used as a display screen, or user-controlled.

31. An apparatus, comprising:
a scene camera to register low resolution video of a scene in high contrast;
an active medium to display said video in a way to block out bright parts of said scene; and
a controller configured to respond to a power failure by clearing at least one region of the active medium.

32. The apparatus of claim 31 wherein said active medium is a transparent display screen that can generate an opaque image.

33. The apparatus of claim 31 wherein optical characteristics of a region of said active medium can be automatically adjusted, used as a display screen, or user-controlled.

34. The apparatus of claim 31, further comprising an eyeglass frame having said active medium, said camera, and controls that are integral to the frame.

35. The apparatus of claim 31, further comprising a frame having said active medium, camera, and controls that are separate from the frame.

36. The apparatus of claim 31 wherein an optical prescription is integral to said active medium.

37. The apparatus of claim 31 wherein the apparatus is integral to a system that includes any of 3D goggles, protective helmet, SCUBA or protective goggles, gradient-dark glasses, visors, or shades.

38. The apparatus of claim 31 wherein the apparatus is integral to a vehicle.

39. The apparatus of claim 31 wherein optical characteristics of the active medium, the optical characteristics including at least one of attach and decay of spots, opacity of spots, size of spots and brightness thresholds for creating/removing spots, are user adjustable.

40. The method of claim 1 wherein clearing the at least one region of the active medium comprises discharging a capacitor.

41. The method of claim 1 wherein a maximum number of the at least one regions is adjustable.

42. The method of claim 41 wherein the maximum number is automatically adjusted in response to ambient light conditions.

43. The method of claim 41 wherein the maximum number is user adjustable.

44. The system of claim 15 wherein the electronics comprise at least one capacitor configured to provide power to clear the at least one region of the active medium in response to a power failure.

45. The system of claim 15, further comprising an eyeglass frame having said active medium, said camera, and said electronics that are integral to the frame.

46. The system of claim 15, further comprising a frame having said active medium, said camera, and wherein at least part of said electronics are separate from the frame.

47. The system of claim 15 wherein an optical prescription is integral to said active medium.

48. The system of claim 15 wherein the system is configured as at least one of 3D goggles, a protective helmet, SCUBA or protective goggles, gradient-dark glasses, visors, and shades.

49. The system of claim 15 wherein the system is integral to a vehicle.

* * * * *